Patented Dec. 6, 1932

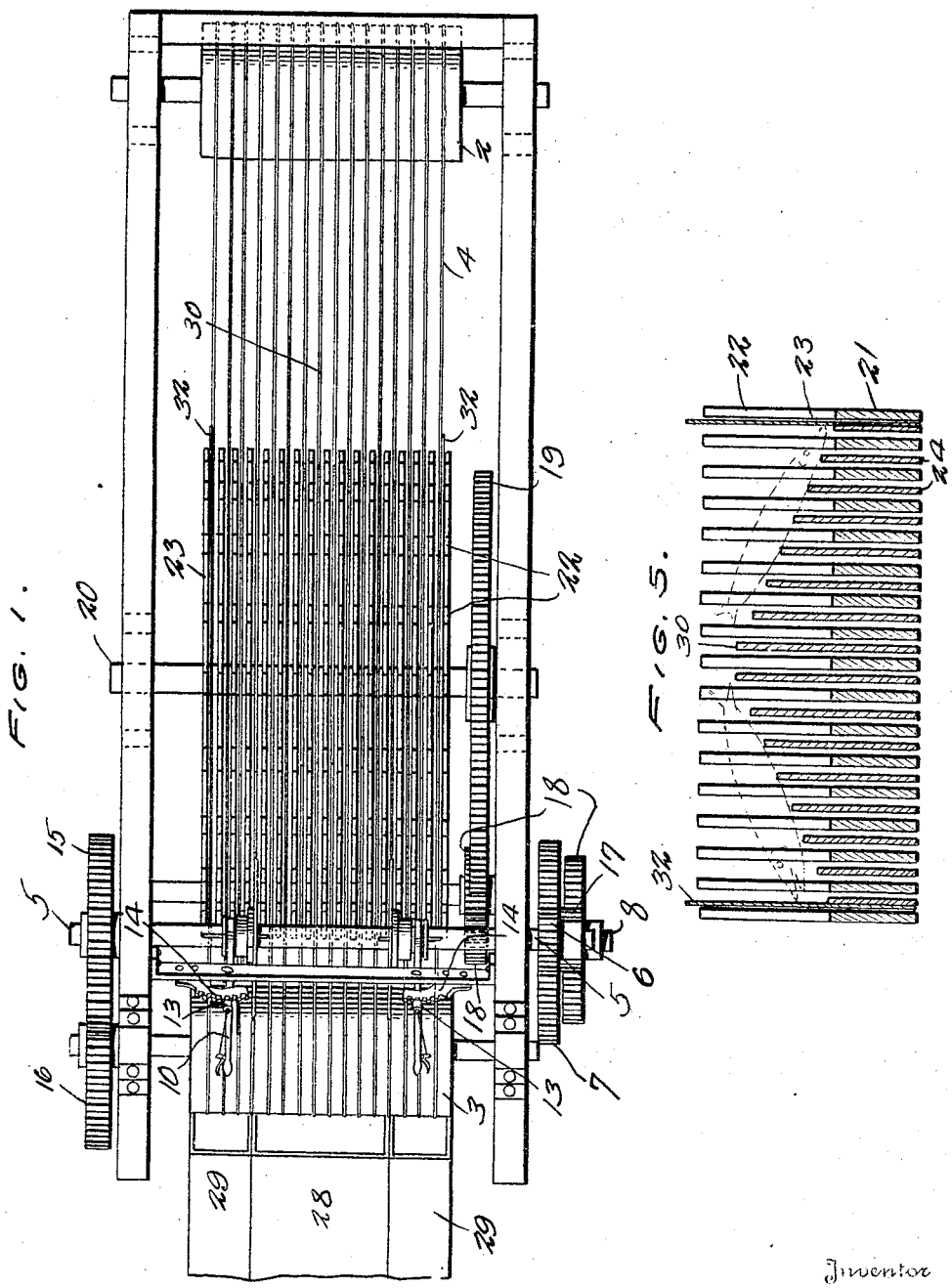

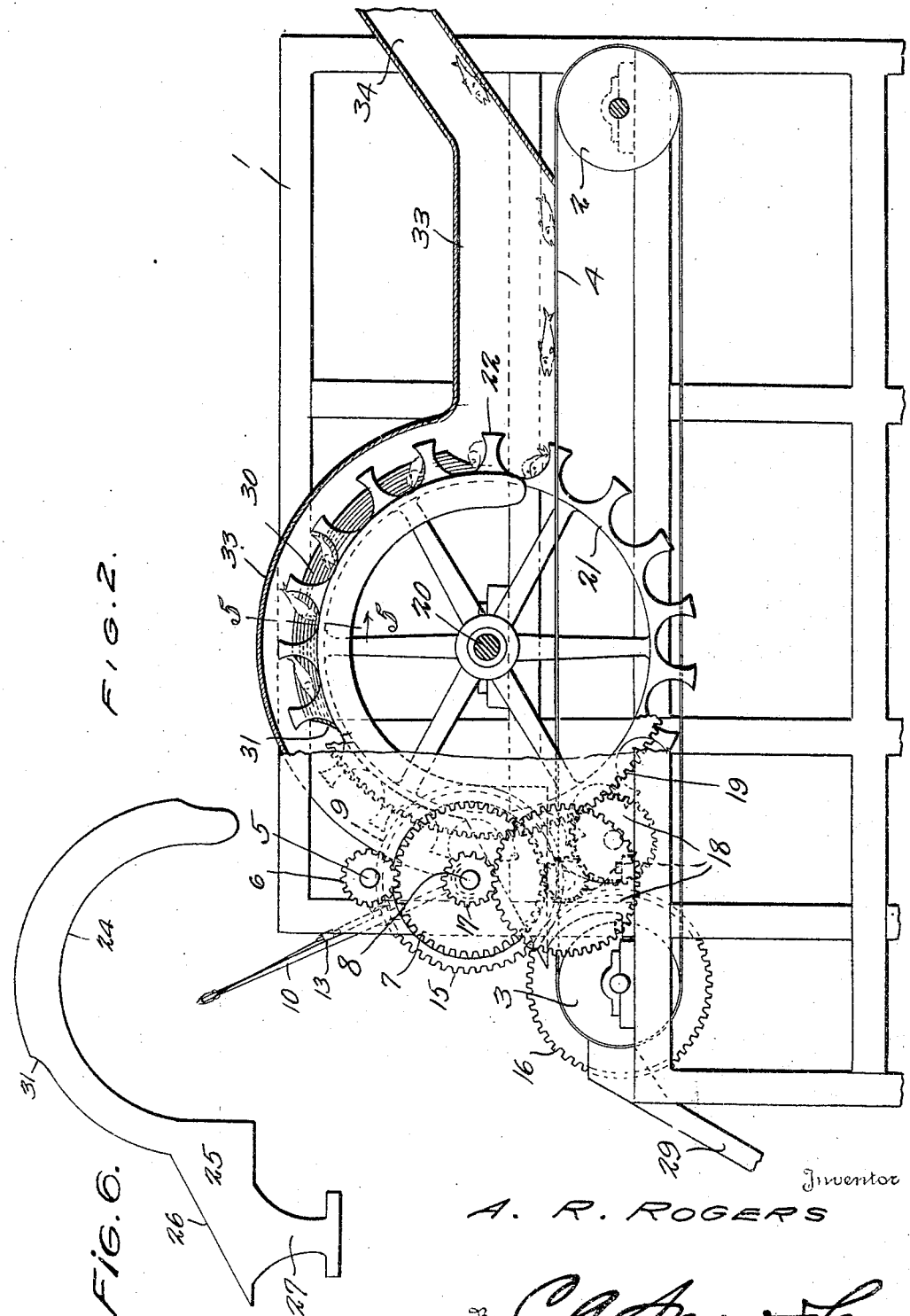

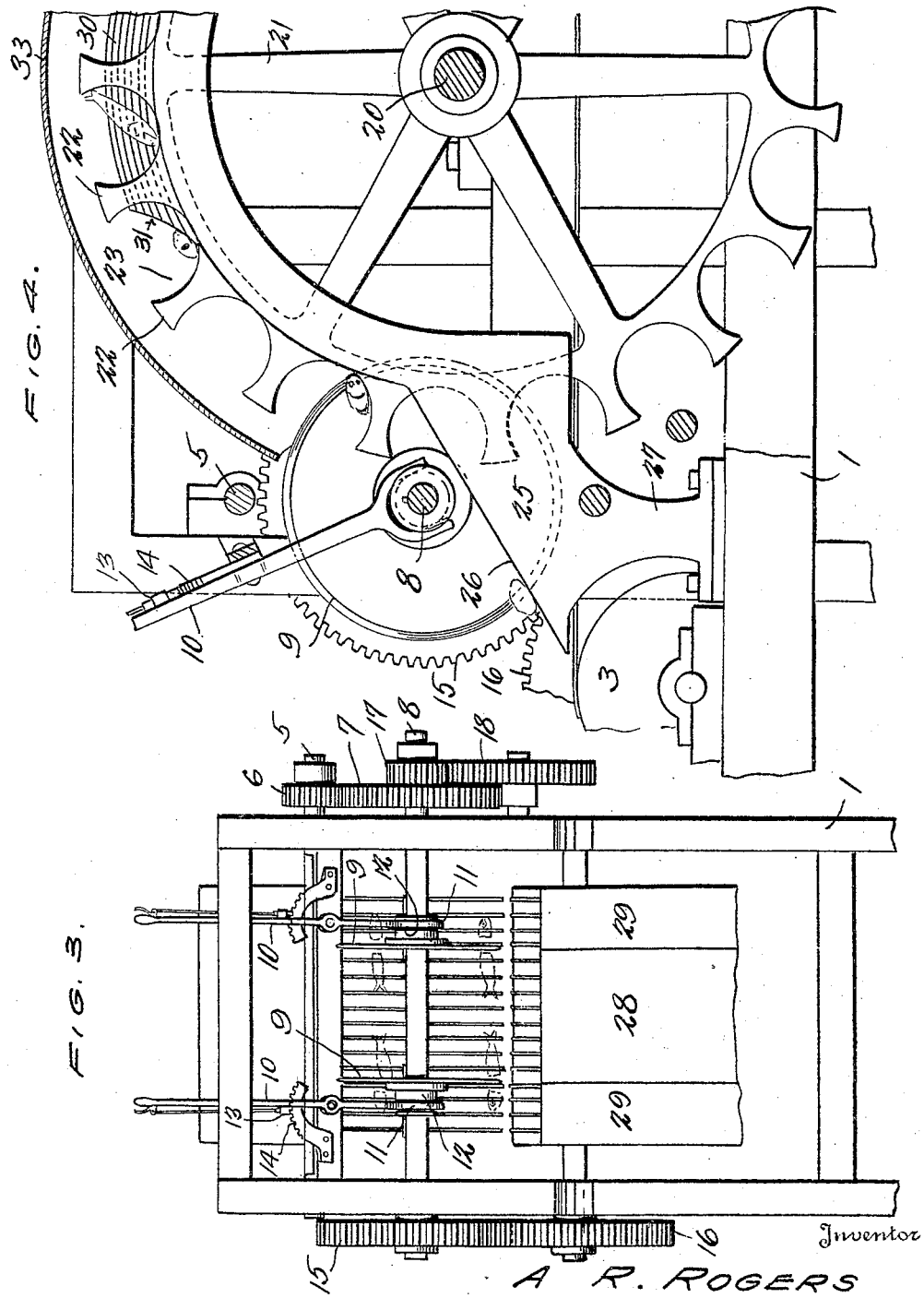

1,889,879

UNITED STATES PATENT OFFICE

ARTHUR R. ROGERS, OF JONESPORT, MAINE

FISH CUTTING MACHINE

Application filed July 22, 1930. Serial No. 469,814.

This invention relates to a machine for cutting off the heads of fish and is designed more especially as an improvement on the machine disclosed in Patent 1,750,431 issued to me on March 11, 1930.

It is an object of the invention to simplify the mechanism, render the machine more compact, and improve upon the means for directing the fish against the gages leading to the cutters.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the machine.

Figure 2 is a side elevation partly broken away.

Figure 3 is an elevation of the delivery end of the machine.

Figure 4 is an enlarged vertical section through said end.

Figure 5 is an enlarged section on line 5—5, Figure 2 through the upper portion of the cradle and the ribs.

Figure 6 is a side elevation of one of the ribs.

Referring to the figures by characters of reference, 1 designates a supporting structure having spaced drums 2 and 3 supporting an endless conveyor consisting of spaced cables or other flexible devices indicated at 4.

Journaled in the frame is a power shaft 5 having a gear 6 which transmits motion through a gear 7 to the shaft 8. Cutting disks 9 are mounted on this shaft so as to rotate therewith and are adjustable toward or from each other by levers 10 having forked ends 11 engaging grooved hubs 12 on the disks. Dogs 13 and racks 14 are used for holding the levers against accidental movement.

A gear 15 is secured to shaft 8 and drives a gear 16 secured to the shaft of drum 3. Another gear 17 is secured to shaft 8 and transmits motion through a train of gears 18 to a gear 19 attached to the shaft 20. This shaft has a series of spaced disks 21 rotatable therewith and extending from the peripheries of the disks are lifting arms 22 forming segmental recesses 23 between them. The recesses aline along lines parallel with the shaft 20 and all of the disks cooperate to form a cradle for picking up fish from the conveyor 4 near drum 2, carrying them upwardly and forwardly and delivering them onto conveyor 4 near drum 3, it being understood that the disks work freely between the cables or the like forming the conveyor.

Supported between the disks 21 are arcuate ribs 24 the inner edges of which are concentric with shaft 20. At one end of each rib is a foot or enlargement 25, the upper edge 26 of which is inclined downwardly from the cradle as shown in Figure 4 and is supported by a pedestal 27 bolted or otherwise connected to the frame 1. These pedestals extend between the adjacent portions of the conveyor cables and the edges 26 cooperate to form an incline for delivering cut fish by gravity from the cradle onto the conveyor and thence to a central chute 28 and side chutes 29.

Beginning at points above the conveyor near the inlet of the machine the ribs are stepped upwardly transversely of the machine to a central ridge 30 formed by the middle rib and these stepped portions continue to points 31 above but back from the cutting disks 9.

Gage plates 32 are supported adjacent to the sides of the machine with any desired number of ribs between them and can be mounted in the same manner as ribs 24. These plates form abutments for the fish so that they will be presented properly to the disks 9. The gage plates can, of course, be placed any desired distances apart, this depending on the size of the fish to be cut.

A housing 33 can be arranged over the conveyor and cradle and has an inlet chute 34 for delivering fish onto the conveyor 4.

In practice the fish are directed into chute 34 and will gravitate to the conveyor. This will conduct them to the cradle where they will be picked up by fingers 22 and arranged by gravity so as to lie in the recesses 23 transversely of the machine. The head of the fish is heavier than the tail. Consequently when the fish begins to ride along the stepped portions of the ribs it will tilt downwardly at the head and slide head first against one of the gage plates. Finally the fish will come against one of the disks 9 where its head will be severed. The fish will then gravitate onto the incline formed by edges 26 and travel to the conveyor 4 from which the body portion will be discharged into chute 28 while the head will fall into one of the side chutes, 29.

What is claimed is:

1. In a machine for cutting fish, the combination with cutters and a series of endless conveying elements, of a rotatable cradle working between said elements for successively picking up a plurality of fish from the conveying elements and depositing them on the conveying elements, and stationary means in the path of fish being conveyed by the cradle for directing the fish head first by gravity transversely of the machine while being conveyed in the cradle.

2. In a machine for cutting fish the combination with cutters and a series of endless conveying elements, of a rotatable cradle working between said elements for successively picking up a plurality of fish from the conveying elements and depositing them on the conveying elements, and stationary means in the path of fish being conveyed by the cradle and stepped upwardly toward the center of said means for directing fish head first by gravity transversely of the machine while being conveyed in the cradle.

3. In a machine for cutting fish, the combination with cutters, and conveying elements for carrying fish toward the cutters, of means working between the conveying elements for picking up fish therefrom, arranging them by gravity, and depositing them on said elements, and separate elements between said means and stepped upwardly toward the center of the machine for directing fish head first by gravity toward the respective sides of the machine into position to be presented to the cutters.

4. In a fish-cutting machine a series of spaced stationary elements stepped upwardly toward the center of said series from the sides thereof, a conveyor movable past said series, and rotatable means working between the spaced elements for picking up fish from the conveyor, dragging them over said series of spaced elements, and depositing them on the conveyor.

5. In a fish-cutting machine a conveyor, gage members, a series of spaced stationary elements between said members and stepped upwardly toward the center of the series from the sides thereof, and means working between the gage members for picking up fish from the conveyor, dragging them over said spaced members and returning them to the conveyor, said stepped series of elements constituting means for directing fish by gravity toward the gage members while the fish are being carried over said elements.

6. A fish-cutting machine including a series of spaced disks rotatably mounted to form a cradle, and a series of ribs between the disks having arcuate edge portions stepped transversely of the series upwardly toward the center of the cradle, said series of ribs constituting means for supporting fish for gravitation head first transversely of the cradle and ribs.

7. In a fish-cutting machine spaced gages, a series of stationary elements between the gages stepped upwardly toward the center of the series, and movable means for sliding fish along said stationary series in positions transversely of their paths of movement, said stepped portions constituting means for causing the fish to slide head first by gravity against the gages while being conveyed.

In testimony that I claim the foregoing as my own, I have hereto affixed my signature.

ARTHUR R. ROGERS.